US012689793B1

(12) United States Patent
Rader et al.

(10) Patent No.: US 12,689,793 B1
(45) Date of Patent: Jul. 21, 2026

(54) AUTOMATED SYSTEM FOR PROVIDING VIDEO ENHANCEMENTS DURING SPORTS BROADCASTS

(71) Applicant: Amazon Technologies, Inc., Seattle, WA (US)

(72) Inventors: Ziv Rader, Tel Aviv (IL); Yossi Biton, Rosh Haayin (IL); Bar Segev, Petah Tikva (IL); Avi Avraham Ben-Cohen, Holon (IL); Ido Yerushalmy, Tel Aviv (IL); Yochai Zvik, Modi'in-Maccabim-Re'ut (IL); Sam Schwartzstein, Palo Alto, CA (US); Alex Strand, Los Angeles, CA (US); Ishay Be'ery, Petah Tikva (IL); Eliran Nachum, Modi'in-Maccabim-Re'ut (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/896,549

(22) Filed: Sep. 25, 2024

(51) Int. Cl.
*H04N 21/431* (2011.01)
*H04N 21/2187* (2011.01)

(52) U.S. Cl.
CPC ..... *H04N 21/4318* (2013.01); *H04N 21/2187* (2013.01); *H04N 21/4316* (2013.01)

(58) Field of Classification Search
CPC ........... H04N 21/4318; H04N 21/2187; H04N 21/4316
USPC ....................................................... 725/100
See application file for complete search history.

(56) References Cited

U.S. PATENT DOCUMENTS

| | | | | |
|---|---|---|---|---|
| 10,325,410 | B1 * | 6/2019 | Smith | G06T 11/00 |
| 12,182,714 | B2 * | 12/2024 | Power | G06N 3/084 |
| 2009/0262137 | A1 * | 10/2009 | Walker | H04H 60/04 |
| | | | | 345/629 |
| 2011/0169959 | A1 * | 7/2011 | DeAngelis | G06V 20/42 |
| | | | | 348/157 |
| 2015/0375083 | A1 * | 12/2015 | Stelfox | A61B 5/6802 |
| | | | | 700/91 |
| 2017/0165570 | A1 * | 6/2017 | Lucey | A63F 13/216 |
| 2018/0133579 | A1 * | 5/2018 | Huke | A63B 71/0616 |
| 2023/0047548 | A1 * | 2/2023 | Day | H04N 21/41407 |
| 2024/0046763 | A1 * | 2/2024 | Huke | G06F 16/24568 |
| 2025/0265449 | A1 * | 8/2025 | Lucey | G06V 20/42 |

* cited by examiner

*Primary Examiner* — Benjamin R Bruckart
*Assistant Examiner* — Alexander Boyd
(74) *Attorney, Agent, or Firm* — K&L Gates LLP

(57) ABSTRACT

Systems and techniques are described for providing video enhancements during sports broadcasts. In various examples, first tracking data representing first respective locations of a first plurality of players on a two-dimensional plane at a first time may be received. First embedding data representing a formation of the first plurality of players at the first time may be generated based at least in part on the first tracking data. A first set of historical plays may be determined based at least in part on searching a first data store using the first embedding data. A first area of the two-dimensional plane corresponding to a play vulnerability may be determined based on respective outcomes of the first set of historical plays. A first graphical overlay may be displayed in association with the first area on a live video feed.

18 Claims, 11 Drawing Sheets

500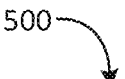

Receiving first tracking data representing first respective locations of a first plurality of players at a first time 510

↓

Generating first embedding data representing a formation of the first plurality of players at the first time based at least in part on the tracking data 520

↓

Determining second embedding data by searching a first data store using the first embedding data, the first data store storing a plurality of historical embeddings representing historical plays 530

↓

Determining a first historical play associated with the second embedding data 540

↓

Retrieving at least one of historical tracking data or historical video data associated with the first historical play 550

FIG. 5

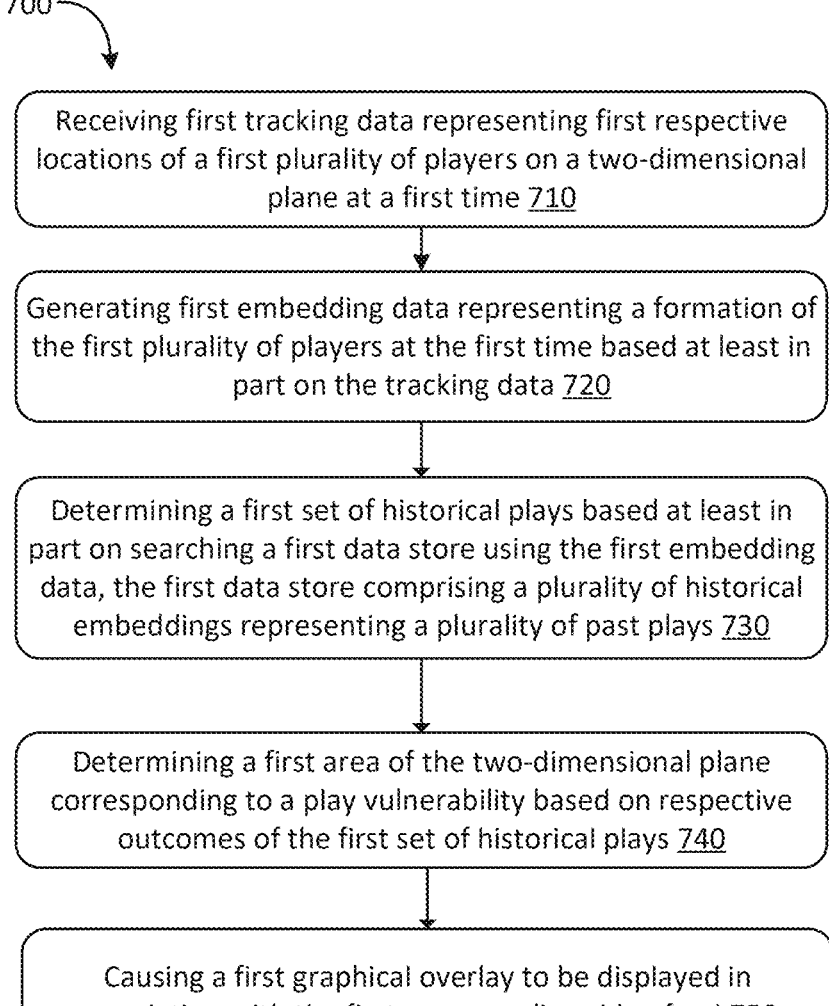

700

Receiving first tracking data representing first respective locations of a first plurality of players on a two-dimensional plane at a first time 710

Generating first embedding data representing a formation of the first plurality of players at the first time based at least in part on the tracking data 720

Determining a first set of historical plays based at least in part on searching a first data store using the first embedding data, the first data store comprising a plurality of historical embeddings representing a plurality of past plays 730

Determining a first area of the two-dimensional plane corresponding to a play vulnerability based on respective outcomes of the first set of historical plays 740

Causing a first graphical overlay to be displayed in association with the first area on a live video feed 750

FIG. 7

AUTOMATED SYSTEM FOR PROVIDING VIDEO ENHANCEMENTS DURING SPORTS BROADCASTS

BACKGROUND

Video streaming refers to technology that allows users to watch video content over the internet in real-time without first downloading the entire media file. Streamed video is often buffered, meaning that some of the video is stored temporarily on the user's device to ensure smooth playback despite possible network slowdowns. Video streaming can be either on-demand or live. On-demand streaming refers to situations in which pre-recorded video is stored on a server and can be watched at any time. Live streaming, on the other hand, refers to situations in which the content is broadcast in real-time (or near real time) over the internet, such as a live video feed from a news channel. In the context of live sporting events, video streaming allows fans to watch games and matches in real-time through the internet. Live streams and/or live broadcasts of sporting events often are accompanied by live commentary and may include additional features such as instant replays, statistics overlays, and different camera angles from which the event may be shown.

BRIEF DESCRIPTION OF DRAWINGS

FIG. 5 depicts an example process for similar play retrieval, in accordance with various examples described herein.

FIG. 7 depicts an example process for determining play vulnerabilities during a sporting event, in accordance with various examples described herein.

DETAILED DESCRIPTION

Figure 1:
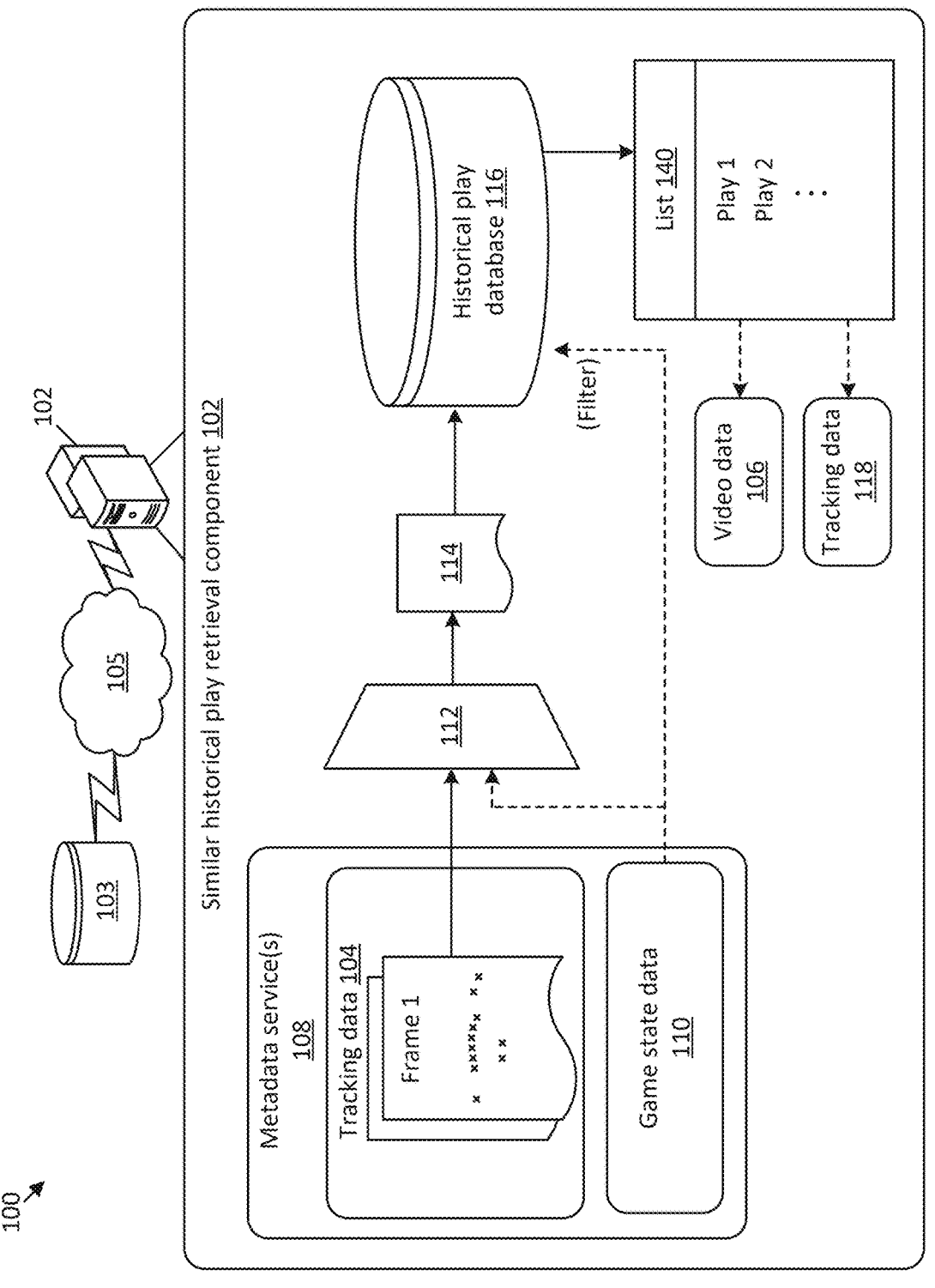
FIG. 1 is a diagram illustrating a system including a similar past play retrieval component, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Graphical overlays are often used to enhance the viewing experience during live video feeds of sporting events (e.g., video streamed over the internet and/or broadcasted using wireless transmissions), ideally without interrupting the viewing of the live event. For example, in American football, virtual first down lines are rendered on the video feed in such a way that the virtual first down lines appear to be on the physical field so that players appear to run over them in the video feed, even though the line is not present in the physical environment. This typically involves superimposing the graphical overlay of the virtual first down line on the field at a depth of field such that players appear to run over the line creating the illusion that the line is actually on the ground.

During a live video feed of a sporting event, it may be desirable to determine similar plays to a current play for a variety of reasons. For example, determining a similar play to a current play may allow for predictions to be made concerning the outcome of the current play, may allow for enhancements enabling a viewer to better understand key players and/or other interactions, may illustrate predicted actions of players, and/or may otherwise be used to enhance the viewing experience of viewers. Retrieval of past similar plays (e.g., video data of similar historical plays) typically requires an analyst with specialized domain knowledge that can call to mind a similar play from the past. Additionally, even when personnel with such specialized domain knowledge are available, they may not be able to retrieve video data and/or other data related to a similar play in real-time before a current play has been executed and shown to the viewer. As such, using conventional techniques, graphical overlays and/or other video enhancements cannot be shown to the viewer overlaying the current play, in real-time, as the current play transpires.

Take, for example, a live video stream of American football, during which a relatively short amount of time may transpire between players lining up for a play at the line of scrimmage and the commencement of the play. Typically, a broadcast team would be unable to evaluate the play as the players line up and retrieve video data and/or other data related to similar historical plays before the current play is executed. However, using the various computer-implemented techniques described herein, data representing past similar plays may be retrieved, in near real-time, even before a current play is executed. This enables a variety of downstream enhancements to the video feed. For example, the routes run by one or more receives can be shown, prior to the snap, based on routes run during one or more similar historical plays retrieved from a data store. In some other examples, areas of predicted defensive vulnerabilities may be shown in a graphical overlay, based on the current offensive and/or defensive formations and based on the outcomes of the retrieved similar historical plays prior to execution of the current play. Graphical overlays may be provided that are depicted during the live video feed which illustrate various information related to and/or determined from the retrieved historical plays (e.g., predicted routes, predicted zones of defensive vulnerabilities, key players to watch for a current play, etc.). As previously described, while such graphics can be added during replays by human operators with specialized domain knowledge, such human operators are unable to retrieve past similar plays and generate such graphical enhancements in real-time for the video feed prior to execution of a current play. As such, the various systems and techniques described herein offer technological improvements to live video, enabling a variety of graphical enhancements to be made in real-time, during the video feed and prior to execution of a given play, which previously could only be offered after the fact (e.g., after the completion of a given play).

In various examples, players may wear sensors (e.g., chips embedded in their jerseys/helmets, etc.) that provide tracking data providing various information about the player (e.g., velocity, direction, player name, player number, in-game statistics, etc.) in the planar coordinate system of the field (e.g., the "field plane"). The chips may include global navigation satellite system (GNSS) sensors (such as global positioning system (GPS) sensors), radio frequency identification (RFID) sensors, etc. Such tracking data may be used to render a graphical overlay over the player in the video stream to provide such information to viewers. Tracking data services provide metadata streams that provide information on the location of tracked objects over time (e.g., over a plurality of tracking frames). For example, in American football, a metadata tracking service uses one or more sensors embedded within a player's jersey or equipment to generate and send tracking data that describes the players location (among other statistics and information) on a top-down two-dimensional (e.g., x, y) coordinate plane representing the playing field. When this tracking data is synchronized with a video of the event (e.g., video of a football game), graphical overlays can be provided that enhance the experience of the viewer.

Since the tracking data can represent the location of each player in the field plane (e.g., in the top-down coordinate plane of the field), formations of players can be encoded and the encoding of the formation (referred to herein as an embedding) may be used to search for similar historical plays (which have been embedded into the same embedding space). Such embeddings may represent not only the field locations of individual players, but also information about the distance between players, the player positions, etc. A distance metric and/or unsupervised clustering technique may be used to determine the most similar play and/or set of plays for a given query play (e.g., by searching a plurality of embeddings generated for historical plays using the embedding for the current play). Upon determining the most similar play or plays, the video data and/or tracking data for such similar historical plays may be retrieved and used to enhance the current video feed of the live sporting event. For example, when a team lines up for a given play (but before the play has started), the most similar historical plays may be retrieved, as described in further detail below. The tracking data for the historical plays may be retrieved and used to provide graphical enhancements on the video feed. For example, the predicted routes of the receivers may be shown (using the tracking data from the retrieved similar play to determine their routes), the trajectory of the ball, predicted blitzing players may be graphically highlighted, areas of defensive vulnerability may be shown, on-field statistics can be computed using the similar historical plays and rendered on the video feed, etc.

In various examples, machine learning techniques may be used to encode player formations to generate embeddings that may be used to retrieve similar historical plays. In other examples, rule-based approaches may be used to generate the player formation embeddings. Generally, machine learning may be used to form predictions, solve problems, generate high-dimensional and/or semantic representations of data, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Although in many examples described herein, player formations may be encoded to generated embeddings using the players locations in the field plane provided by the tracking data, it should be noted that player location data may instead (or also) be detected in the video data and embeddings representing player formations may be generated either directly from the video data or from player location detections detected from the video data (e.g., using computer vision-based person detection).

In either case, the generated embedding representing the player formation (e.g., the formation of offensive and/or defensive players) may be used to search a database storing historical plays that have been encoded in the same manner (e.g., in the same embedding space). Decisions as to whether to embed the offensive team formation, the defensive team formation, or both, may vary according to the desired implementation and/or use case. Additionally, other metadata beyond information about the player formation may be encoded to generate semantically rich embeddings. For example, in addition to the player formations, metadata representing the positions on the field (e.g., yard line, position between the hash marks, current ball position, etc.), metadata representing the score, time remaining, yards to end zone (Y2EZ), down number, yards to first down, number of timeouts remaining, etc., may be encoded to generate semantically rich representation of not only the current player formations, but also the game state. In other examples, instead of embedding such game state data, the game state data (e.g., metadata representing the score, time remaining, yards to end zone (Y2EZ), down number, yards to first down, number of timeouts remaining, etc.) may be used to filter the search space, so that only historical plays having a similar game state which also feature a similar player formation are retrieved. Reducing the search space in this way may reduce latency incurred during the search of the embedding space for similar historical plays. In various examples, this may help to ensure that highly-relevant historical plays are retrieved and can be processed in time so that the desired graphical enhancements may be generated and displayed prior to commencement of the current play.

In various examples described herein, computer vision-based object detectors may be used to detect various objects of interest in video. For example, computer vision-based object detectors may be trained to detect players, footballs, soccer balls, hockey pucks, baseballs, etc., in a sports broadcast. Object detectors are often implemented using convolutional neural networks (CNNs). However, the object detection techniques described herein may be implemented using any desired object detection method including, but not limited to, visual transformer-based object detectors, recurrent neural network (RNN) based object detectors, etc.

CNN-based object detectors work by applying a series of learnable filters to input images to recognize patterns that correspond to objects (including humans, animals, etc., depending on the task(s) for which the object detector is trained). The initial input is an image (e.g., a single image or an image frame of a video) that is analyzed to detect objects. In some cases, the image may be pre-processed to meet the input requirements of the CNN, such as by resizing the image frame, normalization of pixel values, etc.

The pre-processed image frame may next be input into a convolutional layer which applies a learned convolutional filter (sometimes referred to as "kernels") to the input image to generate a feature map. Convolutional filters may slide over the image spatially, pixel-by-pixel, computing dot products between the filter values and the input pixel values. Filters may be designed (or learned) to detect a specific feature, such as an edge, a particular color, a texture, a shape, etc. After the convolution operation, an activation function may be applied to introduce non-linearity into the model (e.g., ReLU, a sigmoid function, etc.). The activation layer may be followed in a CNN-based object detector by a pooling layer. Pooling (subsampling) layers are used to reduce the dimensionality of each feature map independently, thereby reducing the computational load for the network, as well as the risk of overfitting. Max pooling, which takes the maximum value from each patch of the feature map, is a frequently used technique (although other types of pooling, such as average pooling, may also or instead be used).

A CNN-based object detector may have many blocks that comprise a convolutional layer, an activation layer, and a pooling layer that may encode different features of the input image. At some point in the CNN, the feature maps may be flattened into a single vector (sometimes referred to as a "column vector") and passed through one or more fully-connected layers (FCNs) where every input is connected to every neuron in the subsequent layer. The last FCN may have an output layer that may classify a detected object (e.g., "human", "dog", "cat", etc.) and/or may localize the detected object (e.g., using a bounding box and/or pixel-wise segmentation mask to identify a detected object).

During training, CNN-based object detectors use a loss function to evaluate how well the object detector is performing and to update parameters of the object detector to improve performance. Depending on the implementation, the loss may incorporate terms for classification (e.g., was a detected object correctly classified?) and/or localization (was the bounding box and/or segmentation mask accurately located within the image frame?). A common loss function for object detection tasks is the combination of cross-entropy for classification and smooth L1 (Huber loss) for bounding box regression. Training data typically comprises annotated images where objects are labeled with a bounding box or segmentation mask (for localization) and a class label (e.g., "dog", "football", "player") for classification.

More advanced CNN-based object detectors, like Faster R-CNN or YOLO (You Only Look Once), use additional concepts such as anchor boxes or region proposal networks (RPN) to predict object boundaries. RPNs scan the feature maps output by the CNN convolution blocks and generate fixed-size anchor boxes of different scales and aspect ratios. For each anchor box, an RPN may be used to predict an "objectness" score that measure how likely the bounding box is to include an object of any class for which the CNN-based object detector has been trained. These regions may be refined into more precise bounding boxes for object detection.

Storage and/or use of data related to a particular person or device (e.g., video data, notification suppression data, etc.) may be controlled by a user using privacy controls associated with a camera device and/or a companion application associated with the camera device. Users may opt out of storage of personal, device state (e.g., a paused playback state, etc.), and/or video data and/or may select particular types of data that may be stored while preventing aggregation and storage of other types of data. Additionally, aggregation, storage, and use of personal, device state, and/or video data, as described herein, may be compliant with privacy controls, even if not legally subject to them. For example, video data and other data described herein may be treated as if it was subject to acts and regulations, such as the Health Insurance Portability and Accountability Act (HIPAA) and the General Data Protection Regulation (GDPR), even if it is not actually subject to these acts and regulations. Additionally, users may opt out of data collection, and/or may opt to delete some or all of the data used by the various techniques described herein, even where deletion or non-collection of various data may result in reduced functionality and/or performance of various aspects of the systems described herein.

FIG. 1 is a diagram illustrating a system including a similar historical play retrieval component 102, in accordance with various aspects of the present disclosure. In the example, the similar historical play retrieval component 102 may be implemented using one or more computing devices. In various examples, the similar historical play retrieval component 102 may be configured in communication with one or more non-transitory computer-readable memories 103, in accordance with various aspects of the present disclosure. In various examples, the computing device(s) implementing similar historical play retrieval component 102 may be configured in communication over a network 105. Although not shown in FIG. 1, the similar historical play retrieval component 102 may be configured in communication with one or more cameras (e.g., video cameras) used to capture video data of the relevant event (e.g., a live sporting event). In various examples, one or more of the techniques used by the similar historical play retrieval component 102 may be performed using an application specific integrated circuit (ASIC) and/or using a field programmable gate array (FPGA). In some other examples, various techniques of the similar historical play retrieval component 102 may be instantiated in software executed by one or more processors. In yet other examples, the similar historical play retrieval component 102 may be instantiated using some combination of hardware and software.

Network 105 may be a communication network such as a local area network (LAN), a wide area network (such as the Internet), or some combination thereof. The one or more computing devices implementing the similar historical play retrieval component 102 may communicate with non-transitory computer-readable memory 103 (e.g., either locally or over network 105). The non-transitory computer-readable memories 103 may store instructions that may be effective to perform one or more of the various techniques described herein.

The similar historical play retrieval component 102 may receive tracking data 104 from metadata service(s) 108. Tracking data 104 may be received from one or more sensors providing metadata. For example, chips comprising one or more sensors may be embedded in sporting equipment (e.g., balls, equipment, uniforms, etc.) and may provide various metadata such as player names, numbers, positions, velocity, heading, acceleration, field location, etc. In various other examples, velocity, heading, and acceleration information may be computed based on the changing player location over time (e.g., over frames of the tracking data 104). In various examples, the player location data of tracking data 104 may be provided in the field plane (e.g., a top-down coordinate plane representing the playing field). As such, the player location data may identify an x, y coordinate of each player's current location. In various examples, the player location data may be normalized to make the player location data invariant to heading (e.g., offensive direction). Tracking data 104 may be provided in tracking frames which may correspond to a given amount of time. For example, the tracking data 104 may be captured at a particular frame rate.

Metadata service(s) 108 may also provide game state data 110 temporally associated with a game state of each frame of the tracking data 104 (or of a collection of frames of the tracking data 104). As previously described, game state data may include information about a current state of the game. In an American football example, the game state data 110 may include information such as current ball location, score, down, yards until first down, yards until end zone, possession, number of timeouts, etc.

One or more frames of the tracking data 104 may be encoded using encoder 112 to generate embedding data 114. The embedding data 114 may be a representation of the current player formation and may also represent other information provided in the tracking data 104 (e.g., player names, team, positions, numbers, etc.). The embedding data 114 may represent the formation of only the offensive team, only the defensive team, or both. In some examples, the game state data 110 may also be input into the encoder 112 in order to generate embedding data 114 that also encodes the current game state (e.g., down, yards until first down, score, time remaining, number of timeouts, etc.). In other examples, the encoder 112 may encode tracking data 104 to generate embedding data 114 (representing player formations), while the game state data 110 may be used to filter historical play database 116 so that only plays having a similar game state are retrieved.

The embedding data 114 may be generated per-frame of tracking data 104 and/or may be aggregate information from multiple frames (e.g., to account for pre-snap motion and/or to represent a current play including player motions and/or ball motion). In some examples, a batch of embedding data 114 may be generated over the course of a play and the batch of embedding data 114 may be aggregated (e.g., averaged) in order to represent the current play (including motion of the current play).

The encoder 112 may be a rules-based encoder and/or may be a machine learning-based encoder (e.g., a graph neural network, a bidirectional encoder representations from transformers (BERT)-based encoder, etc.). In various examples, training a machine learning-based encoder 112 may be advantageous as the encoder 112 may learn to generate embedding data 114 that is most suitable for the similar historical play retrieval task.

The historical play database 116 may store embedding data generated (e.g., using encoder 112) for a large number of historical plays. In addition, the historical play database 116 may store various structured data representing metadata for each embedding. For example, game state data 110 may be stored in association with each historical play embedding in the historical play database 116. In this way, the game state data 110 of the current play may be used to filter the search space such that only historical plays having a similar game state are considered when searching the historical play database 116. For example, if the current game state data 110 indicates that it is currently $3^{rd}$ down with 12 yards to go, the historical play database 116 may be filtered such that only historical plays occurring on $3^{rd}$ down with greater than 9 yards to go are considered. The particular filtering logic may be empirically determined and/or tunable and may vary according to the desired implementation. In another example, if the current game state data 110 indicates that the offensive team is on the 1 yard line of the opposing team and that it is fourth down, the historical play database 116 may be filtered such that only historical plays occurring on $3^{rd}$ or $4^{th}$ down where the offensive team is within the 5 yard line of the opposing team are considered for retrieval.

As previously described, in various other examples, the game state data 110 may be embedded (and may therefore be represented by the embedding data 114). In such examples, the closest embeddings in the historical play database 116 may be retrieved which may typically include a similar game state.

A distance metric may be used to search the (filtered) search set of the historical play database 116. For example, Euclidean distance, cosine similarity, cosine distance, etc., may be used to find the most similar embeddings in the historical play database 116 to the current embedding data 114. In various examples, the historical play database 116 may be clustered using an unsupervised machine learning-based approach (e.g., K-nearest neighbors, etc.) to determine a number of clusters where plays of a given cluster are determined to be more similar to one another than they are to any play of a different cluster. Accordingly, the embedding data 114 may be assigned to a cluster and its nearest neighbors within that cluster (determined using any desired distance metric) may be retrieved. As shown in FIG. 1, a ranked list 140 of similar historical plays may be output with the highest ranked similar historical play having an embedding that is most similar to the embedding data 114 of the current play in the historical play database 116 (or the filtered subset of the historical play database 116).

Once the list 140 (including the most similar historical play) is retrieved from historical play database 116, video data 106 and/or tracking data 118 may be retrieved for the most similar historical play (and/or for each similar historical play of the list 140). In various examples, the video data 106 and/or tracking data 118 may be used to generate graphical enhancements for the current play in the live video feed. For example, a semi-transparent version of the video data 106 previous play may be rendered on the current play to show the historical play side-by-side with the current play. In a different example, the video data 106 portraying the similar historical play may be shown with a replay of the current play (e.g., side-by-side or overlaid). In a different example, the retrieved tracking data 118 for the retrieved similar historical play may be used to determine routes run by receivers, a direction in which a running back runs, a defensive coverage scheme, etc., of the similar historical play. Then, graphical overlays that illustrate the likely movements (e.g., receiver routes, running direction, etc.) may be overlaid on the current play prior to the snap. In still other examples, metadata representing outcomes of the previous play may be retrieved. For example, the list 140 may include some number (e.g., 25, 50, 100, etc.) of similar historical plays. Some of the similar historical plays may have resulted in completed passes, some in incomplete passes, some in first downs, some in interceptions, etc. In various examples, a percentage of the similar historical plays may have been deemed to have had successful outcomes (while another percentage may be deemed unsuccessful) based on some success metric (e.g., completed pass, achieving a first down, etc.). These past outcomes may be used to determine an area on the field in which the defense is vulnerable (e.g., an area of the field associated with a high concentration of successful outcomes for the offense (e.g., catches for first downs), an area where the offense is susceptible (e.g., from a pass rush), etc. These and other examples are described in further detail below.

Figure 2A:
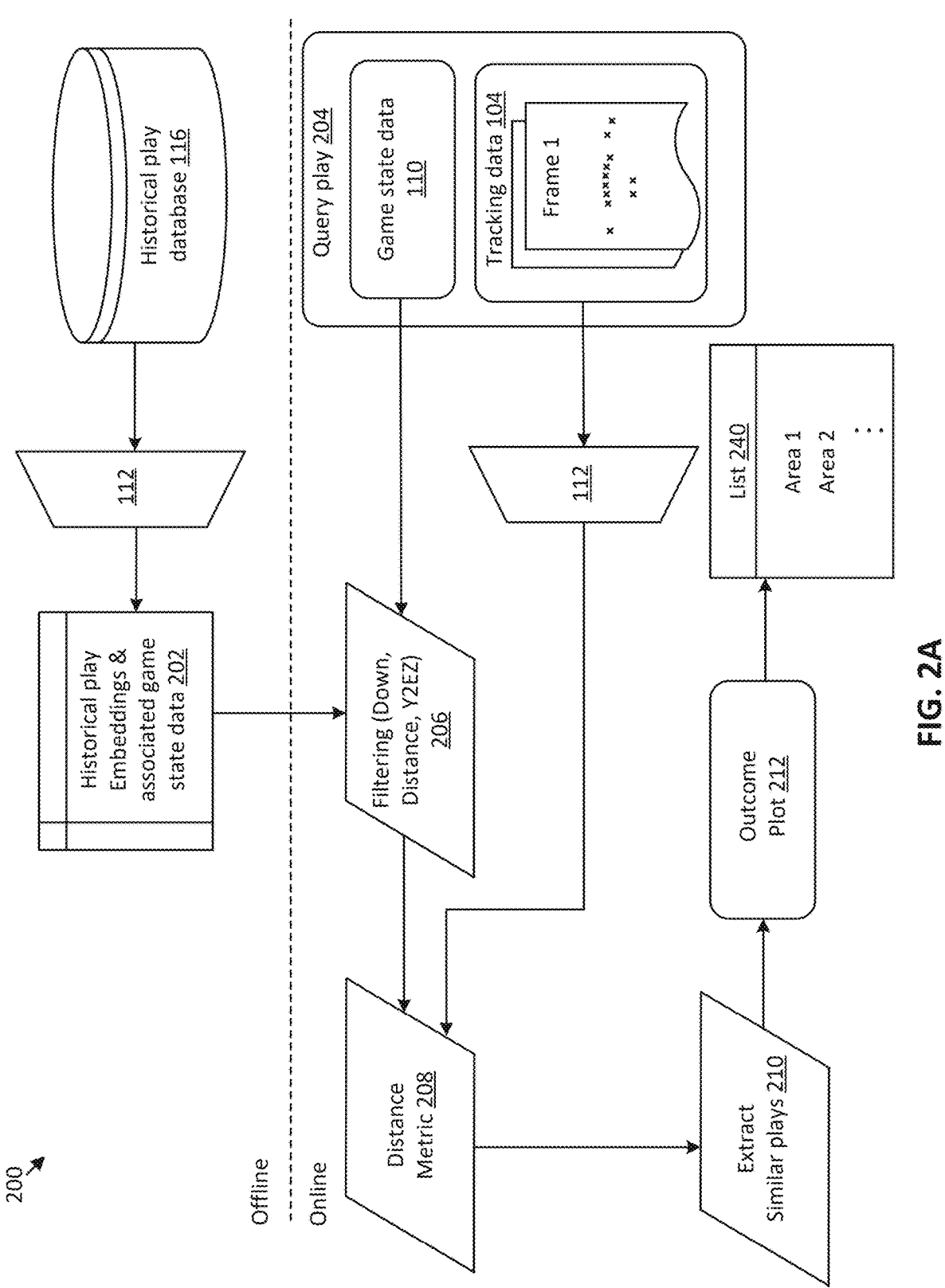
FIG. 2A is a diagram illustrating a system for determining play vulnerabilities during a live video feed of a sporting event, in accordance with various aspects of the present disclosure.

FIG. 2A is a diagram illustrating a system 200 for determining defensive vulnerabilities during a live video feed of a sporting event, in accordance with various aspects of the present disclosure. It should be noted that the system 200 may also determine offensive vulnerabilities such as when an offensive formation is susceptible to a particular type of pass rush. Defensive and offensive vulnerabilities may be generally referred to as "play vulnerabilities."

In an offline mode, historical plays from the historical play database 116 may be embedded using encoder 112 to generate structured data comprising the embeddings of these historical plays as well as associated game state data (e.g., structured data 202). As previously described, in some other examples, the associated game state data may also be input into the encoder 112 such that the resulting embeddings include information about the respective game states. However, for the example described below in reference to FIG. 2A the game state data associated with the historical plays may not be embedded and may instead be separately stored in association with embedding data representing the historical plays. Additionally, for the historical plays, outcome data may be included (e.g., in the game state data) indicating the outcome of each historical play (e.g., data indicated that the play was successful/unsuccessful (based on some predefined success/failure metric), data indicating that the play resulted in a complete pass or an incomplete pass, data indicating that the play resulted in a turnover, data indicating that the play resulted in a first down, etc.).

In offline mode, the system 200 may generate the structured data 202 for any number of historical plays. In various examples, these historical play embeddings and the associated game state data may be filtered using any desired search criteria (e.g., by team, by down, time remaining in quarter, time remaining in half, game score, etc.).

During online mode, a query play 204 may be determined. For example, when a play in the video feed is about to begin, tracking data 104 may be received representing location data for each of the players on the offensive team, defensive team, or both. Additionally, the tracking data 104 may include information about player positions, player names, player teams, etc. The tracking data 104 may represent one frame or multiple frames (e.g., in order to capture motion during the pre-snap and/or during the play). In the example of FIG. 2A, the tracking data 104 may be input into the encoder 112 in order to generate embedding data representing the team formation (or team formations if both offensive team player locations and defensive team player locations are input). The game state data 110 may include metadata describing a current state of the game (e.g., score, down, yards to go for first down, Y2EZ, time remaining, timeouts remaining, etc.). In the example of FIG. 2A, the game state data 110 may be used to filter the structured data 202 (action 206) to determine a subset of historical plays that should be searched for similarity with the embedding data representing the query play 204.

In various examples, action 206 may employ filtering logic to determine the subset of the structured data 202 that should be considered during retrieval. For example, if the game state data 110 indicates that one minute and 35 seconds are remaining in the second quarter, the filtering logic of action 206 may restrict the search set to those embeddings that are associated with game state data indicating that the historical play occurred within the last two minutes of the first half. In another example, if the game state data 110 indicates that it is second down with 4 yards to go for a first down, the filtering logic of action 206 may restrict the search set to those embeddings that are associated with game state data indicating that the historical play was on first down or second down with less than five yards to go for a first down. In yet another example, if the game state data 110 indicates that the offensive team is losing by a score of 21-3 in the fourth quarter, the filtering logic of action 206 may restrict the search set to those embeddings that are associated with game state data indicating that the historical play was made when there was a score difference of greater than 15 points in the fourth quarter of the game. It should be noted that the foregoing examples are for illustrative purposes only. The specific filtering logic used at action 206 may vary according to the desired implementation.

Once the filtering logic of action 206 has determined a subset of the embeddings of the structured data 202 to be considered for retrieval (based on similar game states with the query play 204), a distance metric may be used at action 208 to determine the distance (e.g., a distance value or a similarity score representing a degree of similarity) between the embedding output by encoder 112 for the query play 204 and each embedding in the subset of embeddings, post filtering. The distance/similarities output by action 208 may be used at action 210 to extract the most similar historical plays. For example, the embeddings of the subset of plays that have the highest similarity score (or lowest distance in the embedding space) with respect to the embedding of the query play 204 may be extracted. Any number of similar historical plays may be extracted, as desired.

In the example of FIG. 2A, at action 212, an outcome plot may be generated. The outcome plot may be, for example, a scatter plot indicating two-dimensional locations of passes and/or run plays for the retrieved similar historical plays. In addition, in at least some examples, the data points may be labeled with metadata indicated whether passes were complete or incomplete (e.g., outcome data for the respective historical plays). Other outcome data may also be included for each similar historical play. For example, each play may be labeled with metadata indicating whether the play led to a first down, whether the play led to a turnover, whether the play led to a touchdown, whether the play was part of a successful scoring drive, etc. The particular outcome data used to generate the outcome plot 212 may vary according to the desired implementation. The data points of action 212 may be plotted in the two-dimensional field plane (e.g., a top-down 2D coordinate system representing the playing field). Examples of outputs of action 212 are shown in reference to FIG. 4.

Figure 4:
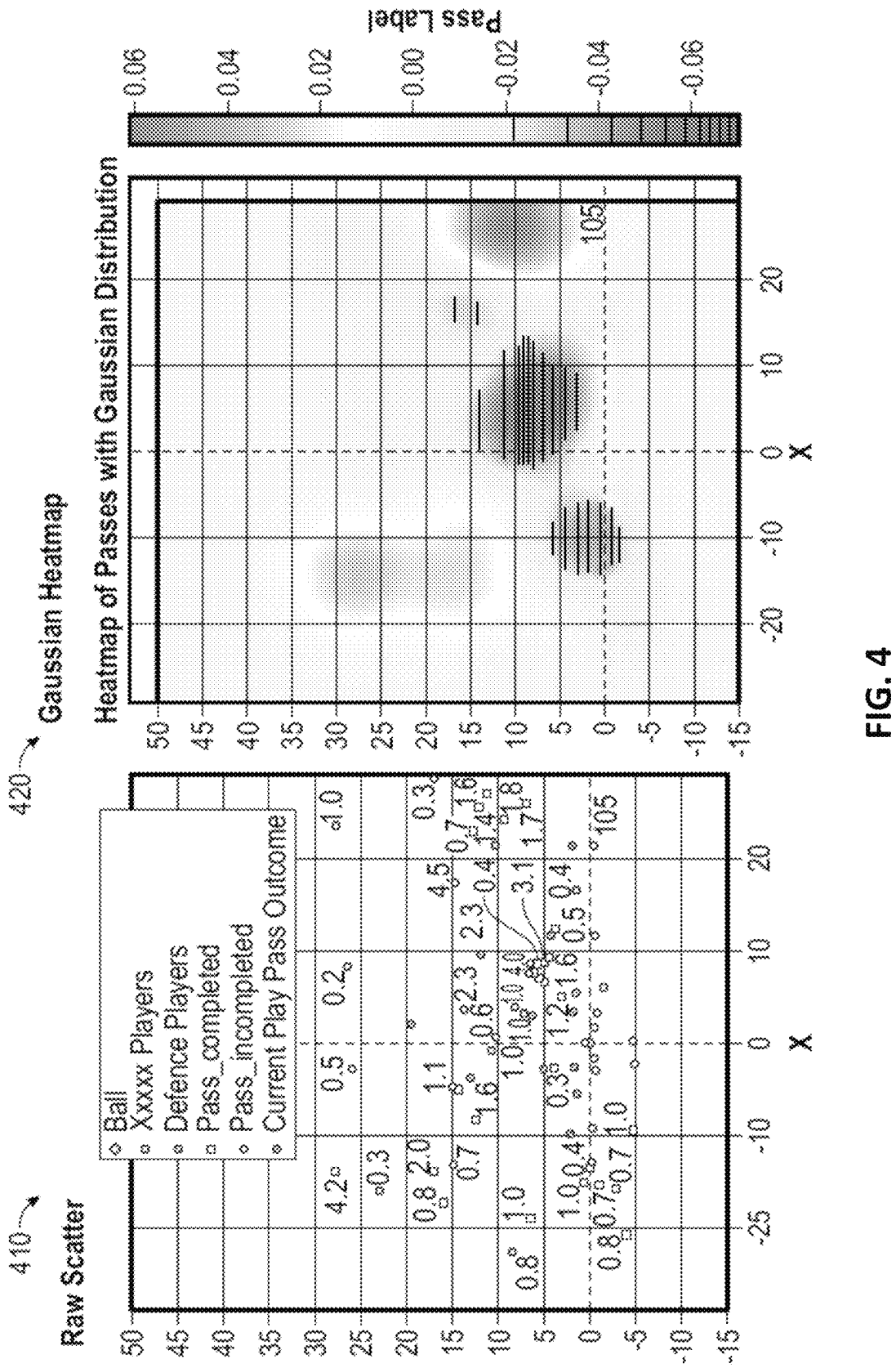
FIG. 4 depicts a scatter plot and a heatmap associated with a set of historical plays that may be used to determine one or more defensive vulnerabilities, in accordance with various embodiments of the present disclosure.

For example, scatter plot 410 of FIG. 4 depicts a plurality of data points associated with outcomes of retrieved similar historical plays shown in relation to the current formation of the current play in the field plane. Data points of the historical plays are shown in the scatter plot 410 in association with labels indicating whether passes associated with the retrieved similar historical plays were complete or was incomplete. In the example of FIG. 4, Expected Points Added (EPA), a statistic that measures how well a team performed compared to the team's expectation for the play, is labeled for each outcome event. It should be noted that any outcome data may be used, according to the desired implementation. The scatter plot with outcome data can be used to generate the Gaussian heatmap 420 showing concentrations of successful historical plays (e.g., locations on the 2D field plane relative to the current play's field location that were associated with higher concentrations of positive historical outcomes (completed passes in this example)) and concentrations of unsuccessful historical plays (e.g., locations on the 2D field plane relative to the current play's field location that were associated with higher concentrations of negative historical outcomes (incomplete passes)). The particular criteria for success may also vary according to the desired implementation and/or the current game state. For example, on first down, a gain of five or more yards may be considered a successful outcome when considering similar historical plays. However, on third down and ten, a gain of greater than five yards, but less than ten yards may be considered an unsuccessful outcome.

Returning to FIG. 2A, such a scatter plot 410 and/or heatmap 420 can be used to identify areas on the field plane associated with defensive vulnerabilities (e.g., locations on the 2D field plane relative to the current play's field location that were associated with higher concentrations of positive historical outcomes for the offensive team (represented in Gaussian Heatmap 420 by more positive pass labels on the Y-axis)) or, more generally, play vulnerabilities. Accordingly, a list 240 may be generated representing areas on the field plane (relative to the current play's field location) associated with positive and/or negative outcomes in similar historical plays.

Figure 2B:
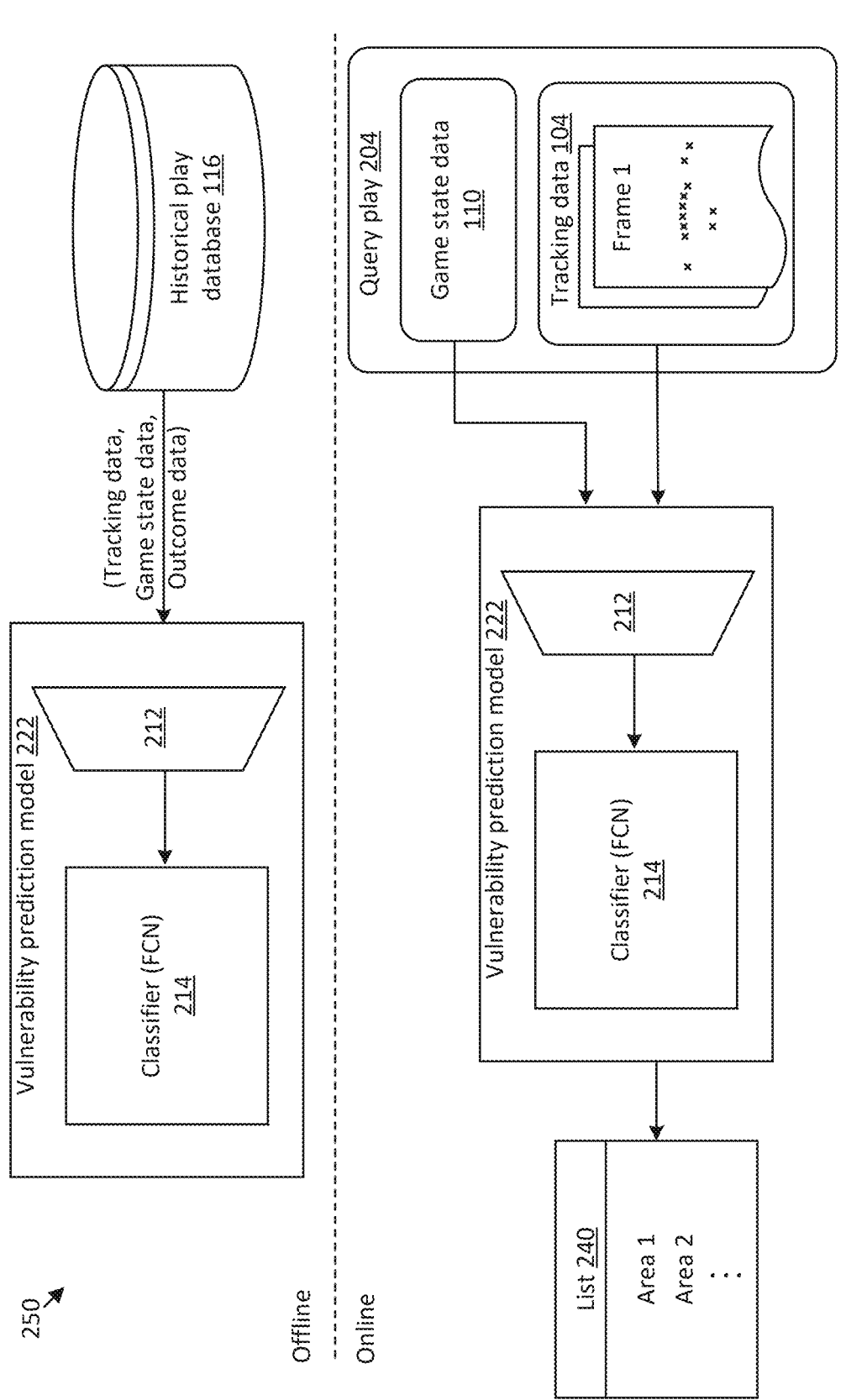
FIG. 2B is a diagram illustrating an example system for predicting play vulnerabilities during a live video feed of a sporting event, in accordance with various aspects of the present disclosure.

FIG. 2B depicts an example system 250 for predicting a play vulnerability, in accordance with various aspects of the present disclosure. In various examples, a supervised machine learning model may be trained to predict one or more areas on the field plane associated with a play vulnerability based on historical outcomes associated with similar historical plays.

For example, the historical play database 116 may include tracking data associated with historical plays, game state data, and/or outcome data. Outcome data may include data indicating whether a pass was complete/incomplete, data indicating whether a first down was achieved, data indicating the number of yards gained/lost, etc. The specific outcome data used may vary according to the desired implementation. In various examples (as described in reference to FIG. 4) the outcome data may be associated with specific areas of the field plane (e.g., the area where an offensive player was downed, an area where a pass was completed (or deemed incomplete), etc.). The vulnerability prediction model 222 may be a supervised machine learning model comprising an encoder 212 (e.g., BERT, a graph neural network, etc.) that may encode the tracking data and/or the game state data of a given historical play and a classifier 214 that may be trained to predict an area of the field plane, for the input historical play, associated with a play vulnerability. The outcome data (including an area associated with a result of the historical play, such as where a pass was complete/incomplete, as shown in FIG. 4) may be used as a label for input training instances (e.g., tracking data and game state data labeled with outcome data). The encoder 212 may embed the tracking data (representing offensive and/or defensive formations of the historical play) and the game state data to generate an embedding. The classifier 214 (e.g., a fully-connected network) may take the embedding as input and may predict an area of the field plane associated with a defensive vulnerability. In various examples, the field plane may be divided into a predefined number of areas. The predefined number of areas may correspond to output neurons in the classifier 214 so that the predictions of the vulnerability prediction model 222 correspond to predicted outcomes in different areas of the field plane. The predicted area may be compared with the outcome data label (indicating the actual area of the field associated with the result of the historical play). Loss may be calculated (e.g., cross-entropy loss) based on the difference between the predicted area and the actual, historical area. Parameters of the vulnerability prediction model 222 (e.g., parameters of the encoder 212 and/or the classifier 214) may be updated using back propagation and gradient descent until the model converges.

After training, in online mode, the query play 204 (including game state data 110 and one or more frames of tracking data 104) may be input into the vulnerability prediction model 222. The vulnerability prediction model 222 may output list 240 (including one or more areas associated with play vulnerabilities (offensive or defensive, depending on the desired implementation).

Various graphical overlays can be generated and displayed over the live video feed prior to execution of the current play using the list 240. For example, the heatmaps showing the areas associated with the highest concentration of past successful outcomes (for offensive teams) may be overlaid on the live video feed (e.g., after transforming the areas from the field plane to a perspective of the video plane using homography). In other examples, polygons representing such areas may be displayed along with (or without) explanatory text. For example, explanatory text may note that such areas are associated with predicted defensive vulnerabilities. Note that these graphical overlays may be generated and displayed prior to the snap and may either be continually rendered on the live video feed during execution of the play or may be removed during play execution (to reduce visual clutter) depending on the desired implementation. In various examples, such areas may be shown with a first opacity pre-snap (e.g., in a darker color with reduced opacity to draw viewer attention) and a second opacity (e.g., an increased opacity) post-snap, during execution of the play (e.g., so that the viewer may focus more on the live play, while still seeing a visual representation of the predicted vulnerability).

Figure 3A:
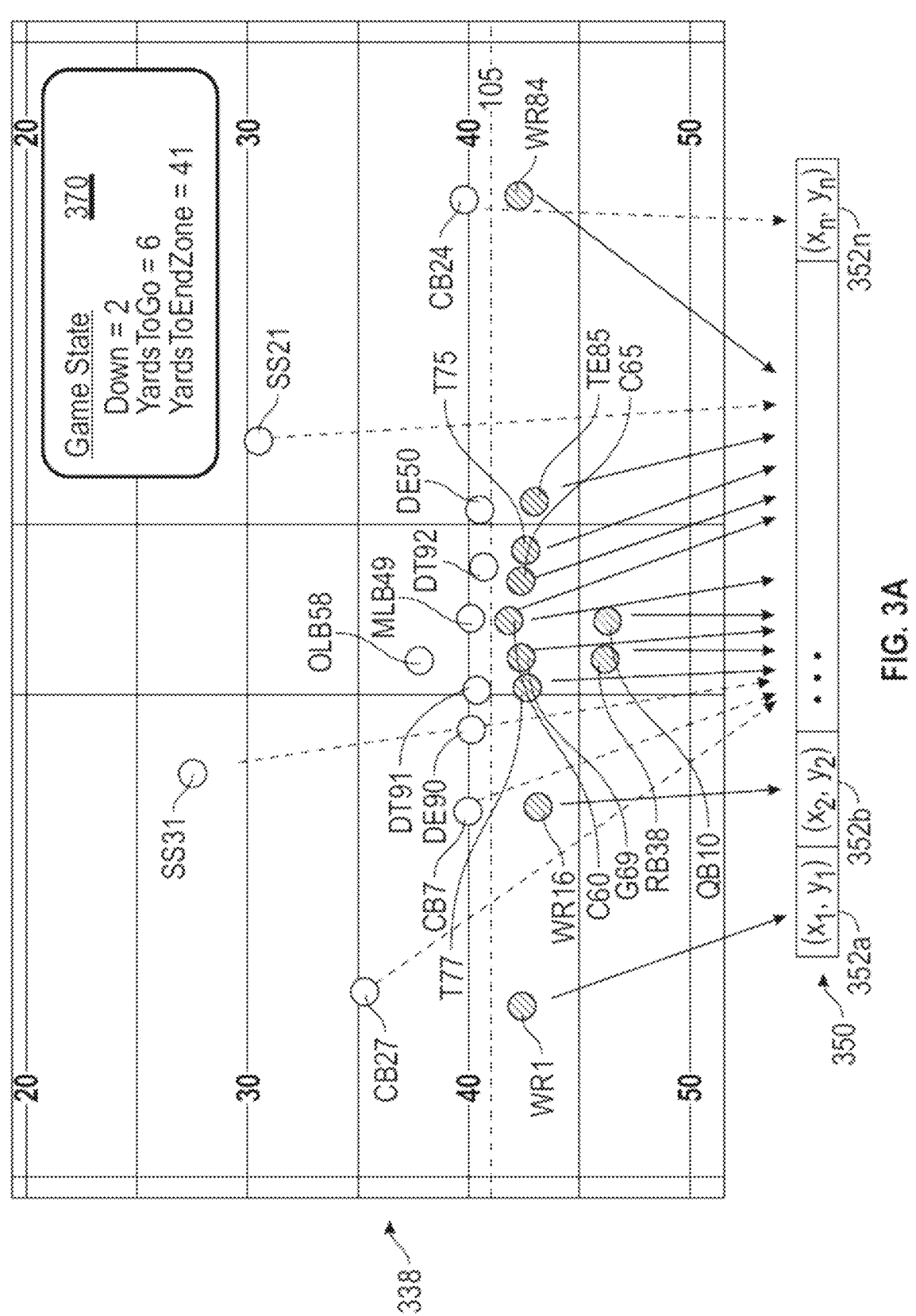
FIG. 3A depicts an example encoding of tracking data to generate an embedding data that may be used, in some examples, to retrieve similar historical plays, in accordance with various aspects of the present disclosure.
Figure 3B:
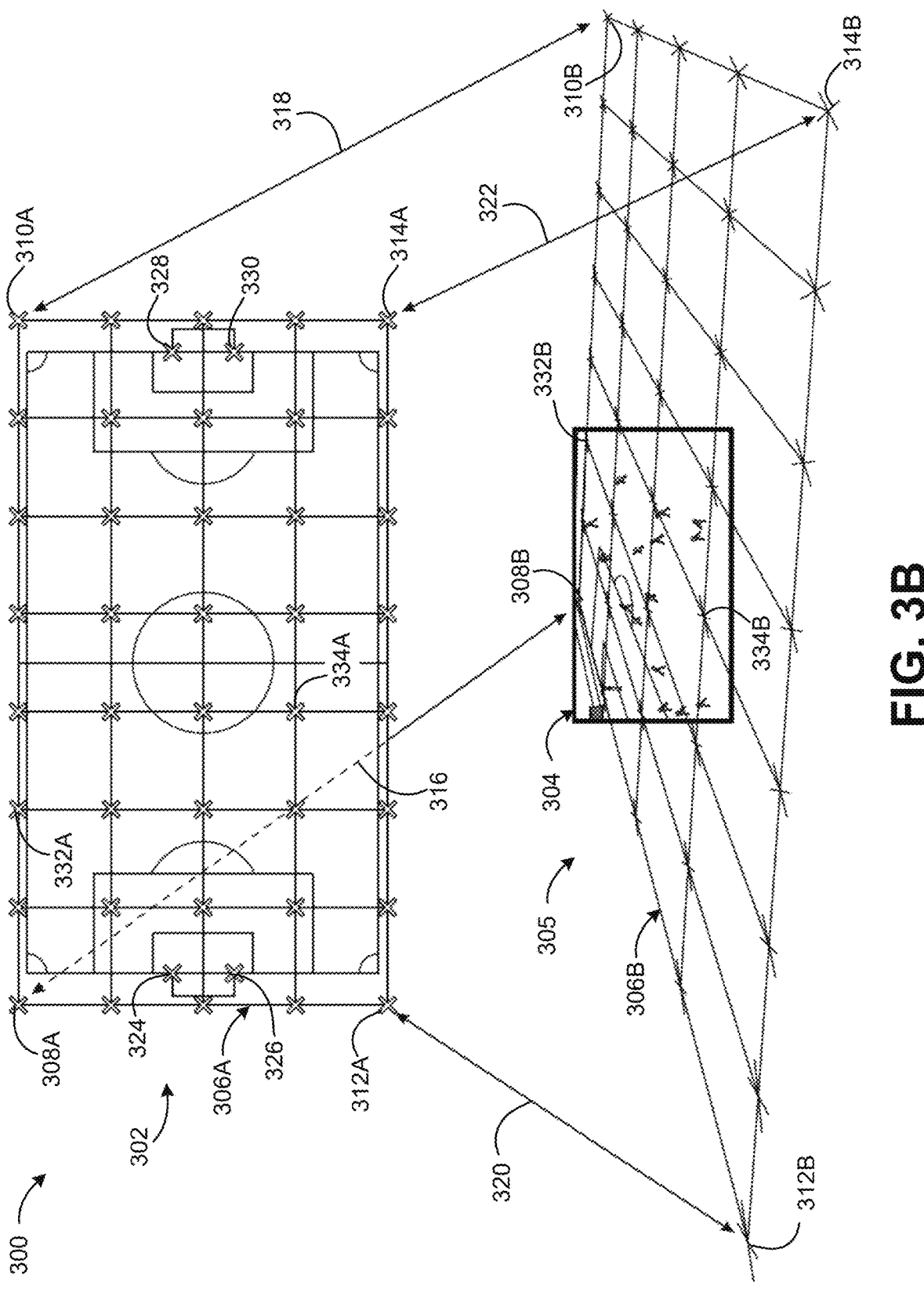
FIG. 3B depicts an example of projection from video coordinate plane to a field coordinate plane, in accordance with various aspects of the present disclosure.
Figure 3C:
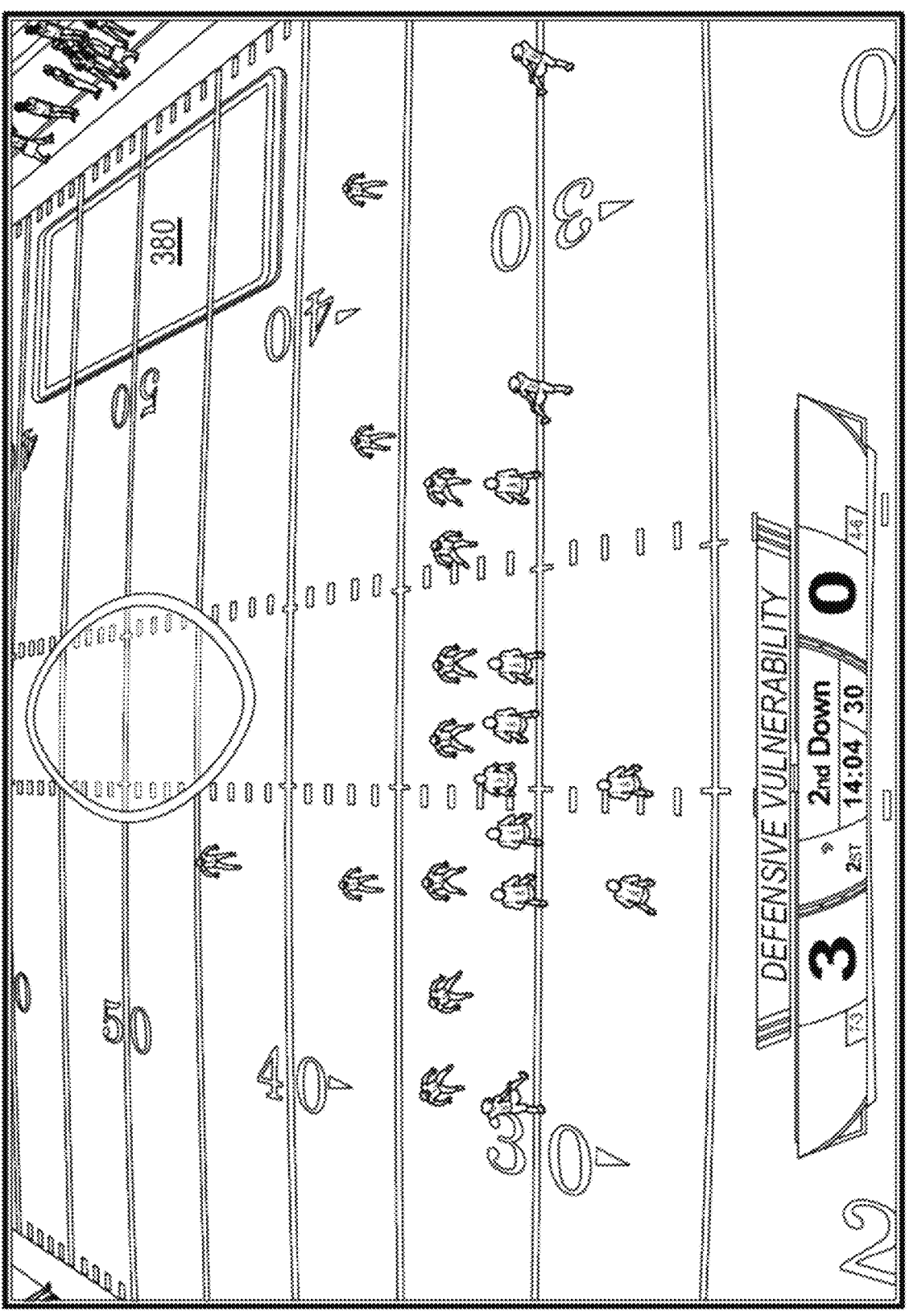
FIG. 3C depicts an example frame of video including a graphical overlay identifying an area on the field associated with a defensive vulnerability, in accordance with various aspects of the present disclosure.
Figure 3D:
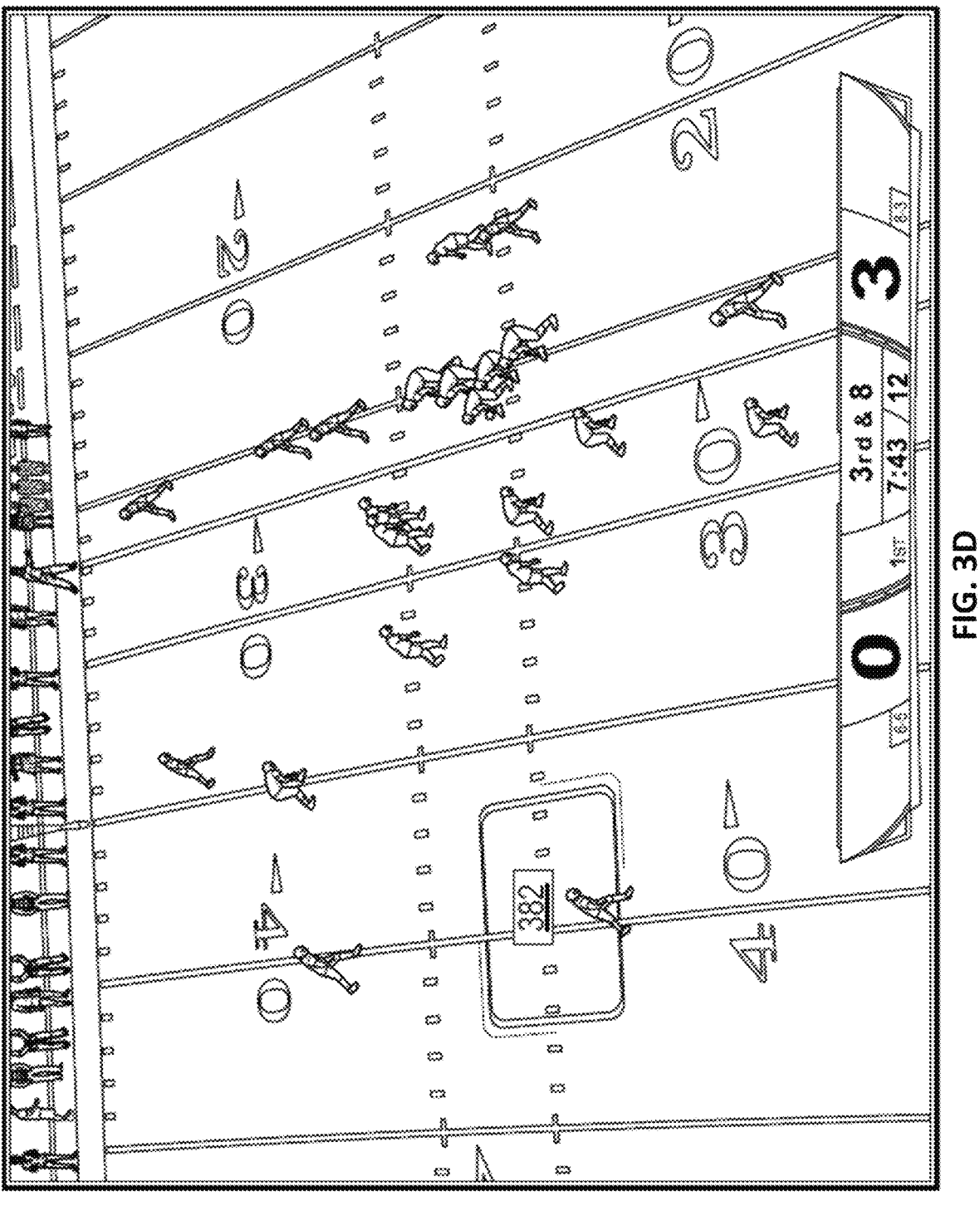
FIG. 3D depicts another example frame of video including a graphical overlay identifying an area on the field associated with a defensive vulnerability, in accordance with various aspects of the present disclosure.

FIG. 3C depicts an example frame of video including a graphical overlay identifying an area 380 (e.g., an area from list 240) on the field associated with a defensive vulnerability, in accordance with various aspects of the present disclosure. For example, the area 380 may be an area associated with a high concentration of successful offensive plays from the retrieved list of similar historical plays. Since the retrieved list of historical similar plays has been generated based on the embedding representing the team formations in the current play, the historical data indicates a likelihood that there is a defensive vulnerability in the portion of the field identified by area 380. FIG. 3D depicts another example frame of video including a graphical overlay identifying an area 382 on the field associated with a defensive vulnerability, in accordance with various aspects of the present disclosure. Note that because the embeddings representing the current play and the historical plays are generated using the 2D field plane tracking data the areas associated with play vulnerabilities can be determined using the same techniques despite different camera feeds and/or camera angles of the live video feed. The example homography techniques depicted in FIG. 3B and described below may be used to transform the identified area(s) from the 2D overhead field plane to the video plane (from the perspective of the camera capturing the live video feed).

The homography system used to perform the homography techniques described herein may be any software (e.g., machine learning models, artificial neural network, computer executable instructions, computer vision software, You Only Look Once (YOLO), etc.), firmware, dedicated hardware (e.g., application specific integrated circuit (ASIC), system on chip (SoC), complex programmable logic device (CPLD), etc.), and/or the like as described herein for, at least in part, applying transformations between different views (e.g., of videos, image planes, etc.) to map points from at least one image plane to a planar surface. In some examples, the homography system may be configured to identify and/or map points in a first plane to a second plane. For example, the homography system may identify points on a field in a first image plane viewed from a 450 angle from the ground and the homography system may identify the same points on the field in a second image plane from a top-down view (e.g., from a 90° angle from the ground, overhead, etc.). In some such examples, the homography system may map the identified points that are common to each image plane to determine a spatial relationship between the first image plane and the second image plane. In some examples, the homography system may map common points in two or more image planes to a common spatial plane (e.g., a flat 2D or top-down model of a space shown in both image planes). For example, a soccer field may be captured by two or more cameras (e.g., any or all of cameras) from different angles and the homography system may map at least one image (e.g., video frame, etc.) from the perspective of each camera to a 2D model of the soccer field. In some such examples, the 2D model may be generated using planar coordinate data (e.g., GPS coordinates, etc.) provided by the metadata service(s) 108.

FIG. 3A depicts an example encoding of tracking data to generate an embedding data that may be used, in some examples, to retrieve similar historical plays, in accordance with various aspects of the present disclosure. In the example depicted in FIG. 3A, a frame of tracking data 338 represents locations of individual offensive and defensive players on the field plane at a given time (e.g., during lineup pre-snap). The tracking data 338 may also represent information such as player names, player numbers, positions, etc. The tracking data may be associated with game state data 370 (in the example shown in FIG. 3A, the game state data

370 includes the down (2), the yards to go for a first down (6), and the yards to the end zone (41).

In one example instantiation of the encoder 112, the x, y coordinate of each player in the filed plane may be concatenated to generate a vector embedding 350. In the example of FIG. 3A, a first player (e.g., a wide receiver on the offensive team) is associated with a first x, y coordinate on the field plane (e.g., $(x_1, y_1)$) in the tracking data 338. Accordingly, this coordinate value may be stored as a first element 352a of the vector. In some examples, the x coordinate and y coordinate may be stored as separate elements of the vector embedding 350; however, in the example of FIG. 3A the 2D coordinate location is shown in a single element of the vector embedding 350, for simplicity. Similarly, a second player (e.g., another wide receiver on the offensive team) is associated with a second x, y coordinate on the field plane (e.g., $(x_2, y_2)$) in the tracking data 338. Accordingly, this coordinate value may be stored as a second element 352b of the vector embedding 350, and so on, until element 352n. In various examples, the set of the elements of the vector embedding 350 may correspond to the offensive team and the remaining elements of the vector embedding 350 may correspond to the defensive team (e.g., culminating in the final coordinate of a defensive player ($x_n$, $y_n$). However, it should be noted that the vector embedding 350 may store other information, such as position designations, offensive team and defensive team designations, current ball location, current yard line, etc.

As the 2D field plane locations of each player are encoded by the vector embedding 350, the vector embedding 350 also encodes the spatial relationships between all the players and can be used to search an embedding database (e.g., historical play database 116) for similar historical plays, as previously described herein. It should be noted that concatenating individual player coordinates to generate the embedding vector 350 is merely one example of an operation that can be performed (e.g., by encoder 112) to embed team formation information (and/or other information) for similar historical play retrieval.

In a different example instantiation of encoder 112 (not shown), a graph neural network (GNN) may be used to encode the team formations. For example, a 2D point may be used to represent each player's current location in the tracking data 338. Each 2D point may represent a node in a graph. Edges between nodes may be formed based on spatial relationships (which may be distance-based in the coordinate system of the field plane). The relationships can be binary (e.g., connected or not) and nodes associated with offensive players may be connected, while being unconnected to nodes associated with defensive players, and vice versa. In various further examples, each node may also be assigned a feature vector representing the properties of that node. Such properties may be, for example, a position, a name, a number, whether the player is an eligible receiver, game state data, etc. A GNN's architecture is designed to learn from the graph topology and node features. Common layers in GNNs may include graph convolutional networks (GCNs), graph attention networks (GAT), and/or message passing neural networks (MPNNs).

In message passing, in each layer, the nodes aggregate information from their neighboring nodes through a process called message passing, which involves transforming and combining feature vectors from adjacent nodes and edges. The message passing process enables each node to learn about its local graph structure and can ultimately be used to encode global graph properties.

Training of a graph neural network may comprise adjusting the GNN parameters to minimize a loss function, which may measure the difference between the network's output and the true (ground truth) values for the training task. The learning task may be a graph-level regression or classification task wherein the graph representation is used to retrieve the same historical play, during training. Loss may be calculated when different plays are retrieved and may be used to adjust parameters of the GNN. After training, the GNN may be used to generate embedding data for current plays (e.g., query play 204) so that the most similar historical plays may be retrieved. The most similar historical plays may be retrieved because the GNN embeddings represent the learned representations that may capture both the intrinsic properties of the nodes as well as their spatial relationships.

As previously described, the embedding data for team formations described herein may be encoded over multiple time steps (e.g., over multiple frames of tracking data) such that the embedding data (or batches of embeddings) may represent the changes in the team formations over multiple time steps (e.g., over the course of a play) and may thus represent team motion.

FIG. 3B depicts an example of projection from video coordinate plane to a field coordinate plane, in accordance with various aspects of the present disclosure. As shown, homography 300 is a projective transformation between two or more planes that maps the two or more planes based on a plurality of common (or shared) points. Homography 300, as shown, comprises a planar coordinate system 302 (e.g., of the field plane) mapped to an image plane 305 of a video frame 304. In some examples, as depicted in FIG. 3B, the planar coordinate system 302 may be overlayed on a soccer field. In other examples, the planar coordinate system 302 may be overlayed on any sporting venue (e.g., a hockey rink, football field, baseball field, etc.). In some examples, a homography matrix (e.g., for homography 300 or the like described herein) may be applied between any planar coordinate system and the image plane of any video frame that share common points (e.g., identifiable features, coordinates, etc.).

The planar coordinate system 302, as shown, may be any coordinate system (e.g., x-y coordinates, RFID receiver locations, GPS coordinates, etc.). In some examples, metadata service(s) 108 (shown in FIG. 1) may be configured to generate (or define) one or more points of the planar coordinate system 302 for a sports venue (e.g., soccer field, hockey rink, etc.). For example, the planar coordinate system 302 may generate a plurality of GPS coordinate points (e.g., the plurality of points each represented in FIG. 3B with an "X") at fixed intervals across a field, rink, and/or the like as described herein. In some such examples, the planar coordinate system 302 may comprise (or define) coordinates for specific features (e.g., goalposts, boundaries, etc.) on the field, rink, and/or the like.

As shown, planar coordinate system 302 comprises a plurality of points (each represented in FIG. 3B with an "X") comprising point 308a, point 310a, point 312a, point 314a, point 324, point 326, point 328, point 330, point 332a, and point 334a. As shown, point 308a, point 310a, point 312a, point 314a are each located at a respective corner of planar coordinate system 302. Additionally, point 324, point 326, point 328, and point 330 are each located at coordinates representing the location of goalposts (i.e., the sides of one or more soccer goals in the depicted example). Additionally, or alternatively, planar coordinate system 302 may comprise a plurality of gridlines (e.g., gridline 306a) connecting one or more points in the coordinate system (e.g., of the field plane coordinate system). In some examples, a homography system performing homography 300 may generate a template comprising the plurality of gridlines (e.g., gridline 306a) and the plurality of points (e.g., point 308a, point 334a, point 326, etc.) and may use this template to map the homography to a plurality of video frames.

The video frame 304, as shown, comprises a scene of a soccer match on a soccer field. In addition, video frame 304 comprises (or defines) an image plane 305 which represents the soccer field from the perspective (e.g., viewing angle) of the camera capturing the video. In the depicted example, video frame 304 comprises point 308b, point 332b, and point 334b which correspond to point 308a, point 332a, and point 334a respectively in planar coordinate system 302. In some examples, the homography system performing homography 300 may detect shared (or common) points between a video frame (e.g., video frame 304 or the like) and a planar coordinate system (e.g., planar coordinate system 302 or the like) to map the planar coordinate system to an image plane of the video frame. In the depicted example, the homography system may identify point 308b, point 332b, point 334b, and/or any other points (or features) shown in the video frame 304 to match the video frame 304 to the planar coordinate system 302.

Additionally, or alternatively, the homography system may map (or align) the points of planar coordinate system 302 with the points of video frame 304. For example, the homography system may transform (e.g., stretch, rotate, compress, translate, etc.) planar coordinate system 302 to align it with the video frame 304. For example, as shown, point 308a is translated (and/or rotated) along mapping line 316 to align with point 308b in video frame 304. It should be noted that point 332a and point 334a are similarly translated (and/or rotated) along their respective mapping lines (not shown). Further, it should be noted that a plurality of points between the planar coordinate system 302 and the video frame 304 may be aligned (or mapped) to ensure that planar coordinate system 302 is overlaid on video frame 304 in the correct proportions. As shown, points outside of video frame 304 may be aligned relative to the points within video frame 304 to generate a full mapping between planar coordinate system 302 and video frame 304. In the illustrated example, point 310a is translated along mapping line 318 to point 310b, point 312a is translated along mapping line 320 to point 312b, and point 314a is translated along mapping line 322 to point 314b. It should be noted that this process may be performed for any or all points of planar coordinate system 302. Additionally, or alternatively, a plurality of gridlines (e.g., gridline 306a) of the planar coordinate system 302 may be translated to the image plane 305. For example, as shown, gridline 306a of the planar coordinate system 302 may be translated to the gridline 306b in the image plane 305. In some examples, the homography system may use homography lines comprising a plurality of points to map a field plane to one or more image planes (from one or more video frames).

FIG. 5 depicts an example process 500 for similar play retrieval, in accordance with various examples described herein. The actions of the process 500 may represent a series of instructions comprising computer readable machine code (e.g., computer executable instructions stored in computer readable media) executable by a processing unit of similar historical play retrieval component 102, although various operations may be implemented in hardware, as desired. In various examples, the computer readable machine codes may be comprised of instructions selected from a native instruction set of the processor(s) and/or an operating system of the computing device.

Process 500 may begin at action 510, at which first tracking data representing first respective locations of a first plurality of players at a first time may be received. The first tracking data may be received together with other frames of tracking data representing the respective locations of a first plurality of players over multiple time steps. The first plurality of players may be from the same team or different teams. Additionally, while many examples discussed herein discuss American football, it should be noted that the various historical play retrieval techniques described herein may be used in other contexts both within and outside of sports.

Processing may continue at action 520, at which first embedding data may be generated that represents a formation of the first plurality of players at the first time based at least in part on the tracking data. For example, a vector embedding representing different 2D locations of the individual players may be generated. In other examples, a GNN may generate embedding data representing a graph of the players where individual players are represented as nodes, and edges represent spatial distances (and/or other distances) between the players. Additionally, the embedding data may be aggregated such that the resulting embedding data (or collection of embeddings) represents player formations over multiple time steps.

Processing may continue at action 530, at which second embedding data may be determined by searching a first data store using the first embedding data. The first data store may store a plurality of historical embeddings representing historical plays. For example, historical plays may be embedded in the same way as the current play (e.g., using encoder 112 as described above). A distance metric (and/or unsupervised machine learning technique) may be used to determine the most similar embeddings stored in the first data store (e.g., historical play database 116) to the first embedding data. In various examples, game state data may be used to filter the search space (e.g., the set of embeddings of past plays stored in the first data store) such that only embeddings representing past plays with similar game states to the current game state are considered when determining the most similar embeddings to the first embedding data.

Processing may continue at action 540, at which a first historical play associated with the second embedding data may be determined. Each of the embeddings stored in the first data store may correspond to a historical play. Accordingly, upon determining the second embedding data (e.g., the embedding that is retrieved after searching the first data store using the first embedding data (e.g., embedding data representing the current play)) the historical play that is associated with the second embedding data may be determined.

Processing may continue at action 550, at which at least one of historical tracking data or historical video data associated with the first historical play may be retrieved. The specific data retrieved for the first historical play may depend on the desired use case. For example, if a side-by-side play comparison is desired for a replay, the video data for the first historical play may be retrieved. In another example, if graphical overlays representing receiver routes, ball movement, ball carrier routes, blitz patterns, etc., are to be displayed prior to the snap of the current play, the historical tracking data for the first historical play may be retrieved. The tracking data may be used to generate graphical overlays corresponding to the motion in the 2D field plane. Homography may be used to transform this tracking data (e.g., historical tracking data showing the trajectory of the receivers during the retrieved first historical play) into the video plane so that graphical overlays may be shown as the predicted receiver routes prior to the snap.

Figure 6:
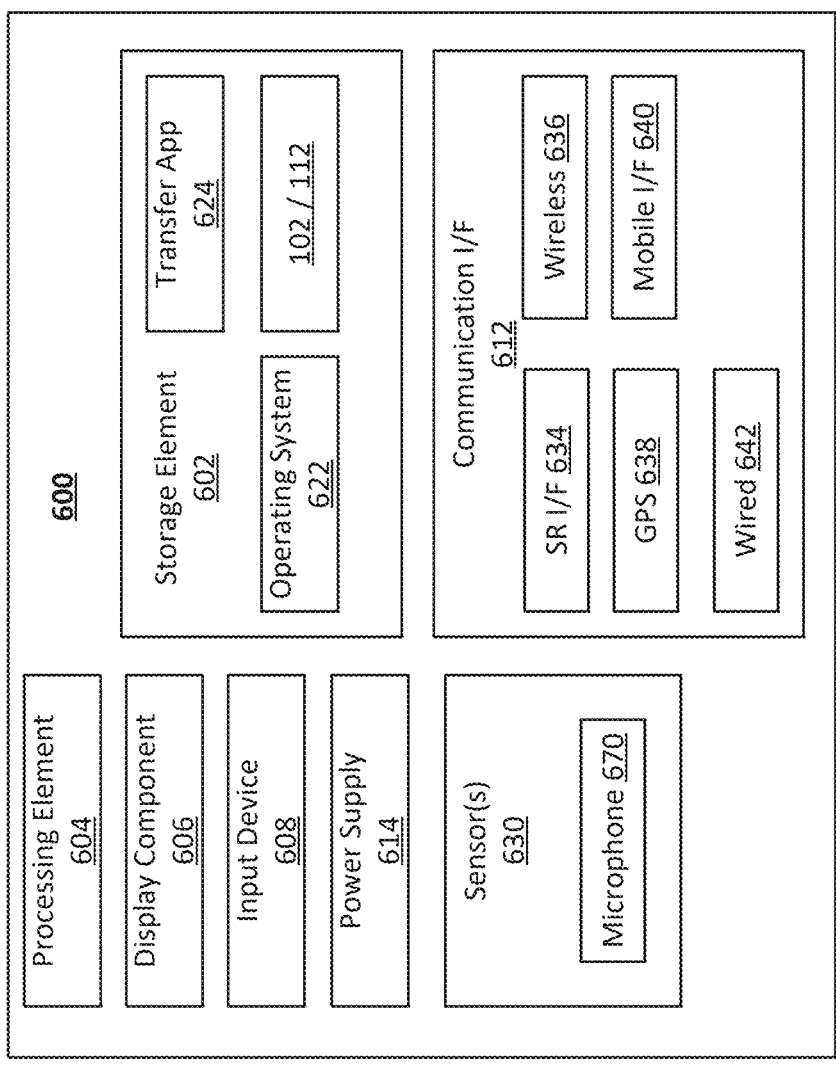
FIG. 6 is a block diagram showing an example architecture of a computing device that may be used in accordance with various aspects of the present disclosure.

FIG. 6 is a block diagram showing an example architecture 600 of a computing device, such as computing device(s) implementing the similar historical play retrieval component 102, and/or other computing devices described herein. It will be appreciated that not all user devices will include all of the components of the architecture 600 and some user devices may include additional components not shown in the architecture 600. The architecture 600 may include one or more processing elements 604 (e.g., processors) for executing instructions and retrieving data stored in a storage element 602. The processing element 604 may comprise at least one processor. Any suitable processor or processors may be used. For example, the processing element 604 may comprise one or more digital signal processors (DSPs). In some examples, the processing element 604 may be effective to perform automatic synchronization of video data and tracking data, as described above. The storage element 602 can include one or more different types of memory, data storage, or computer-readable storage media devoted to different purposes within the architecture 600. For example, the storage element 602 may comprise flash memory, random-access memory, disk-based storage, etc. Different portions of the storage element 602, for example, may be used for program instructions for execution by the processing element 604, storage of images or other digital works, and/or a removable storage for transferring data to other devices, etc.

The storage element 602 may also store software for execution by the processing element 604. An operating system 622 may provide the user with an interface for operating the user device and may facilitate communications and commands between applications executing on the architecture 600 and various hardware thereof. A transfer application 624 may be configured to send and/or receive image and/or video data to and/or from other devices (e.g., a mobile device, remote device, image capture device, and/or display device). In some examples, the transfer application 624 may also be configured to upload the received images to another device that may perform processing as described herein (e.g., a mobile device or another computing device). In various examples, storage element 602 may include similar historical play retrieval component 102 and/or encoder 112 and/or computer-executable instructions for performing the various operations described herein for similar play retrieval, play vulnerability determination, etc. The similar historical play retrieval component 102 and/or the encoder 112 may generate the embedding data and/or perform retrieval of similar historical plays. In some examples, the architecture 600 may be implemented on a camera device that captures the video data (e.g., video data 106), while in other examples the video data 106 and/or tracking data 104 may be received from other computing devices and the architecture 600 may execute the similar historical play retrieval component 102 to retrieve similar historical plays, as described herein.

When implemented in some user devices, the architecture 600 may also comprise a display component 606. The display component 606 may comprise one or more light-emitting diodes (LEDs) or other suitable display lamps. Also, in some examples, the display component 606 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 600 may also include one or more input devices 608 operable to receive inputs from a user. The input devices 608 can include, for example, a push button, touch pad, touch screen, wheel, joystick, keyboard, mouse, track-ball, keypad, light gun, game controller, or any other such device or element whereby a user can provide inputs to the architecture 600. These input devices 608 may be incorporated into the architecture 600 or operably coupled to the architecture 600 via wired or wireless interface. In some examples, architecture 600 may include a microphone 670 for capturing sounds, such as voice commands.

When the display component 606 includes a touch-sensitive display, the input devices 608 can include a touch sensor that operates in conjunction with the display component 606 to permit users to interact with the image displayed by the display component 606 using touch inputs (e.g., with a finger or stylus). The architecture 600 may also include a power supply 614, such as a wired alternating current (AC) converter, a rechargeable battery operable to be recharged through conventional plug-in approaches, or through other approaches such as capacitive or inductive charging.

The communication interface 612 may comprise one or more wired or wireless components operable to communicate with one or more other user devices. For example, the communication interface 612 may comprise a wireless communication module 636 configured to communicate on a network, such as the network 105, according to any suitable wireless protocol, such as IEEE 802.11 or another suitable wireless local area network (WLAN) protocol. A short range interface 634 may be configured to communicate using one or more short range wireless protocols such as, for example, near field communications (NFC), Bluetooth, Bluetooth LE, etc. A mobile interface 640 may be configured to communicate utilizing a cellular or other mobile protocol. A Global Positioning System (GPS) interface 638 may be in communication with one or more earth-orbiting satellites or other suitable position-determining systems to identify a position of the architecture 600. A wired communication module 642 may be configured to communicate according to the USB protocol or any other suitable protocol. The architecture 600 may also include one or more other sensors 630 such as, for example, one or more position sensors, image sensors, and/or motion sensors.

FIG. 7 depicts an example process for determining play vulnerabilities during a sporting event, in accordance with various examples described herein. The actions of the process 700 may represent a series of instructions comprising computer readable machine code (e.g., computer executable instructions stored in computer readable media) executable by a processing unit of similar historical play retrieval component 102, although various operations may be implemented in hardware, as desired. In various examples, the computer readable machine codes may be comprised of instructions selected from a native instruction set of the processor(s) and/or an operating system of the computing device.

Process 700 may begin at action 710, at which first tracking data representing first respective locations of a first plurality of players on a two-dimensional plane (e.g., the field plane) at a first time may be received. The first tracking data may be received together with other frames of tracking data representing the respective locations of a first plurality of players over multiple time steps. The first plurality of players may be from the same team or different teams. Additionally, while many examples discussed herein discuss American football, it should be noted that the various historical play retrieval techniques described herein may be used in other contexts both within and outside of sports.

Processing may continue at action 720, at which first embedding data may be generated that represents a formation of the first plurality of players at the first time based at least in part on the tracking data. For example, a vector embedding representing different 2D locations of the individual players may be generated. In other examples, a GNN may generate embedding data representing a graph of the players where individual players are represented as nodes, and edges represent spatial distances (and/or other distances) between the players. Additionally, the embedding data may be aggregated such that the resulting embedding data (or collection of embeddings) represents player formations over multiple time steps.

Processing may continue at action 730, at which a first set of historical plays may be determined based at least in part on searching a first data store using the first embedding data. The first data store may comprise a plurality of historical embeddings representing a plurality of past plays. The first data store may store a plurality of historical embeddings representing historical plays. For example, historical plays may be embedded in the same way as the current play (e.g., using encoder 112 as described above). A distance metric (and/or unsupervised machine learning technique) may be used to determine the most similar embeddings stored in the first data store (e.g., historical play database 116) to the first embedding data. In various examples, game state data may be used to filter the search space (e.g., the set of embeddings of past plays stored in the first data store) such that only embeddings representing past plays with similar game states to the current game state are considered when determining the most similar embeddings to the first embedding data. A list (e.g., a ranked list, such as list 240) of the most similar embeddings to the first embedding data may be retrieved and historical plays corresponding to the embeddings in the list may be determined. Additionally, outcome data may be determined for the list of historical plays along with any label data representing the outcomes and/or success/failure criteria. Plot data may be generated to map outcomes of the list of historical plays to the field plane with respect to a position of the current play. For example, scatter plots (such as scatter plot 410) and/or heat maps (such as heat map 420) may be generated using the similar historical plays and their respective outcomes.

Processing may continue at action 740, at which a first area of the two-dimensional plane corresponding to a play vulnerability (e.g., a defensive vulnerability or an offensive vulnerability) may be determined based on the respective outcomes of the first set of historical plays. For example, a concentration of successful outcomes in a particular area of the field plane may be determined. Similarly, a concentration of unsuccessful outcomes in an area of the field plane may be determined. The areas may generally be determined based on a relative concentration of successful (or unsuccessful) outcomes within a fixed or variable size area. For example, a Gaussian heatmap may be generated and the area may be determined based on an area in which a certain number of successful historical outcomes have occurred.

Processing may continue at action 750, at which a first graphical overlay may be caused to be displayed in association with the first area on a live video feed. The live video feed may be a video feed that is streamed over the Internet or may be a broadcast video that is broadcast via wireless communication technologies. The first graphical overlay may be a semi-transparent polygon that may be rendered using augmented reality techniques such that the polygon appears to be on the physical playing surface (e.g., on the field underneath the players). In other examples, the heat map may be rendered on the video feed to show "hot" and "cold" predicted for the current play.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A computer-implemented method comprising:
receiving a first frame of tracking data indicating a respective location of each player of a first plurality of players on a field plane at a first time, wherein the tracking data is generated by a first plurality of sensors;
generating first embedding data representing a spatial formation of the first plurality of players at the first time based at least in part on the first frame of tracking data;
determining first game state data temporally associated with the first frame of tracking data, wherein the first game state data describes at least one of a current ball location, a current down, and a distance until a first down;
determining a subset of historical embeddings representing historical plays by filtering a set of historical plays using the first game state data;
determining, by searching the subset of historical embeddings using the first embedding data and a distance metric, a first set of historical plays;
determining, for each historical play of the first set of historical plays, a respective outcome of the respective historical play;
determining an area of the field plane corresponding to a highest concentration of successful outcomes among the respective outcomes of historical plays of the first set of historical plays; and
causing a first graphical overlay to be displayed in association with the area on a live video feed depicting the first plurality of players.

2. The computer-implemented method of claim 1, further comprising:
generating a Gaussian heatmap representing a first concentration of the successful outcomes in the area of the field plane and a second concentration of unsuccessful outcomes in a different area of the field plane, wherein the first graphical overlay comprises a visual representation of the Gaussian heatmap.

3. The computer-implemented method of claim 1, further comprising:
determining, for each of the historical plays of the first set of historical plays, an expected points added statistical value;
generating a respective two-dimensional data point in the field plane for each of the historical plays of the first set of historical plays;
generating weighted two-dimensional data points by weighting each of the two-dimensional data points using the corresponding expected points added statistical value; and
determining the area of the field plane corresponding to the highest concentration of successful outcomes based at least in part on the weighted two-dimensional data points.

4. A computer-implemented method comprising:
receiving first tracking data representing first respective locations of a first plurality of players on a two-dimensional plane at a first time;
generating first embedding data representing a formation of the first plurality of players at the first time based at least in part on the first tracking data;
determining a first set of historical plays based at least in part on searching a first data store using the first embedding data, the first data store comprising a plurality of historical embeddings representing a plurality of past plays;
determining a first area of the two-dimensional plane corresponding to a play vulnerability based on respective outcomes of the first set of historical plays;
transforming the first area from the two-dimensional plane to a second area in a video plane of a live video feed using homography; and
causing a first graphical overlay to be displayed in association with the second area of the video plane on the live video feed.

5. The computer-implemented method of claim 4, further comprising:
generating first two-dimensional plot data comprising a respective data point for each of the plurality of past plays; and
generating, for each of the respective data points, a respective label associated with either a positive or negative outcome of the respective data point.

6. The computer-implemented method of claim 4, further comprising:
receiving, from a first metadata service, first game state data associated with the first tracking data; and
determining a subset of the plurality of past plays by filtering the plurality of past plays using the first game state data, wherein the determining the first set of historical plays comprises searching the subset of the plurality of past plays using the first embedding data.

7. The computer-implemented method of claim 4, further comprising:
determining a first subset of the first set of historical plays associated with a successful outcome of an offensive team;
determining a second subset of the first set of historical plays associated with an unsuccessful outcome of the offensive team; and determining the first area based at least in part on a concentration of the first subset of the first set of historical plays in the first area.

8. The computer-implemented method of claim 4, further comprising:

receiving, from a first metadata service, first game state data associated with the first tracking data; and generating, by a first encoder, the first embedding data further representing the first game state data.

9. The computer-implemented method of claim 4, further comprising:

receiving second tracking data representing second respective locations of the first plurality of players on the two-dimensional plane at a second time;

generating second embedding data representing the formation of the first plurality of players at the second time based at least in part on the second tracking data;

generating an aggregated embedding data based at least in part on a combination of the first embedding data and the second embedding data; and determining a second set of historical plays based at least in part on searching the first data store using the aggregated embedding data.

10. The computer-implemented method of claim 4, wherein the first graphical overlay comprises a heat map indicating a concentration of successful outcomes for offensive teams associated with the first area.

11. The computer-implemented method of claim 4, wherein the first graphical overlay comprises a polygon indicating the first area associated with successful outcomes for offensive teams.

12. The computer-implemented method of claim 4, further comprising:

generating first two-dimensional plot data comprising a respective data point for each of the plurality of past plays, wherein each of the respective data points is associated with a successful outcome or an unsuccessful outcome for at least one offensive team; and determining the first area based at least in part on determining a bounded area comprising a highest concentration of data points associated with successful outcomes.

13. A system comprising:

at least one processor; and non-transitory computer-readable memory storing instructions that, when executed by the at least one processor, are effective to cause the at least one processor to:

receive first tracking data representing first respective locations of a first plurality of players on a two-dimensional plane at a first time;

generate first embedding data representing a formation of the first plurality of players at the first time based at least in part on the first tracking data;

determine a first set of historical plays based at least in part on searching a first data store using the first embedding data, the first data store comprising a plurality of historical embeddings representing a plurality of past plays;

determine a first area of the two-dimensional plane corresponding to a play vulnerability based on respective outcomes of the first set of historical plays;

transform the first area from the two-dimensional plane to a second area in a video plane of a live video feed using homography; and cause a first graphical overlay to be displayed in association with the second area of the video plane on the live video feed.

14. The system of claim 13, wherein the non-transitory computer-readable memory stores further instructions that, when executed by the at least one processor, are further effective to:

generate first two-dimensional plot data comprising a respective data point for each of the plurality of past plays; and generate, for each of the respective data points, a respective label associated with either a positive or negative outcome of the respective data point.

15. The system of claim 13, wherein the non-transitory computer-readable memory stores further instructions that, when executed by the at least one processor, are further effective to:

receive, from a first metadata service, first game state data associated with the first tracking data; and determine a subset of the plurality of past plays by filtering the plurality of past plays using the first game state data, wherein the determining the first set of historical plays comprises searching the subset of the plurality of past plays using the first embedding data.

16. The system of claim 13, wherein the non-transitory computer-readable memory stores further instructions that, when executed by the at least one processor, are further effective to:

determine a first subset of the first set of historical plays associated with a successful outcome of an offensive team;

determine a second subset of the first set of historical plays associated with an unsuccessful outcome of the offensive team; and determine the first area based at least in part on a concentration of the first subset of the first set of historical plays in the first area.

17. The system of claim 13, wherein the non-transitory computer-readable memory stores further instructions that, when executed by the at least one processor, are further effective to:

receive, from a first metadata service, first game state data associated with the first tracking data; and generate, by a first encoder, the first embedding data further representing the first game state data.

18. The system of claim 13, wherein the non-transitory computer-readable memory stores further instructions that, when executed by the at least one processor, are further effective to:

receive second tracking data representing second respective locations of the first plurality of players on the two-dimensional plane at a second time;

generate second embedding data representing the formation of the first plurality of players at the second time based at least in part on the second tracking data;

generate an aggregated embedding data based at least in part on a combination of the first embedding data and the second embedding data; and determine a second set of historical plays based at least in part on searching the first data store using the aggregated embedding data.

* * * * *